(12) United States Patent
Campbell

(10) Patent No.: US 7,731,150 B2
(45) Date of Patent: Jun. 8, 2010

(54) MALLEABLE MOLD AND METHOD OF USE THEREOF

(76) Inventor: Bruce M. Campbell, 620 Meday Ave., Mattituck, NY (US) 11952

( * ) Notice: Subject to any disclaimer, the term of this patent is extended or adjusted under 35 U.S.C. 154(b) by 0 days.

(21) Appl. No.: 11/104,336

(22) Filed: Apr. 12, 2005

(65) Prior Publication Data

US 2006/0226334 A1 Oct. 12, 2006

(51) Int. Cl.
*B28B 7/06* (2006.01)
(52) U.S. Cl. .................. 249/127; 249/119; 425/803
(58) Field of Classification Search ............... 425/803, 425/DIG. 44; 264/239; 249/103, 120, 83, 249/119, 127
See application file for complete search history.

(56) References Cited

U.S. PATENT DOCUMENTS

| | | | | |
|---|---|---|---|---|
| 3,483,908 A | * | 12/1969 | Donovan ................ 221/260 |
| 3,831,899 A | * | 8/1974 | Doig ..................... 249/97 |
| 3,947,209 A | * | 3/1976 | Fox ...................... 425/440 |
| 3,974,996 A | * | 8/1976 | Violet ................... 249/112 |
| 3,982,720 A | * | 9/1976 | Inderbiethen ........... 249/81 |
| 4,004,773 A | * | 1/1977 | Binder .................. 249/93 |
| 4,022,862 A | * | 5/1977 | McBride et al. ........ 264/275 |
| 5,078,945 A | * | 1/1992 | Byron ................... 264/278 |
| 5,939,005 A | * | 8/1999 | Materna ................ 264/255 |
| 6,793,193 B2 | * | 9/2004 | de Groote ............. 249/119 |

* cited by examiner

*Primary Examiner*—Maria Veronica D Ewald
(74) *Attorney, Agent, or Firm*—James J. Lillie; Lillie Law LLC

(57) ABSTRACT

A mold device including a body having a hollow, three-dimensional shape with at least one opening therein; the body being made from a material having a malleable characteristic, and having an axis extending vertically there through, wherein the inner surface of the body is, optionally, topographically contoured, with an upper limit of about five hundred (500) thousands of inch, has a reusable means for releasably positioning a wick stand.

22 Claims, 4 Drawing Sheets

MALLEABLE MOLD AND METHOD OF USE THEREOF

BACKGROUND OF THE INVENTION

This invention relates to a candle mold apparatus, which enables greater design options, in particular, a device that offers greater design options by simplifying the fabrication device and fabrication process(es).

SUMMARY OF THE INVENTION

The present invention is directed to a mold device having a primary objective of enabling greater design options via a simplified fabrication device and fabrication process.

Another objective of the present disclosure includes providing a mold design that provides extended life expectancy of the mold.

A still further objective of the present disclosure includes providing a mold design that provides increased performance, reliability, and tighter tolerances of the mold, thereby yielding a superior quality product and product yield.

An additional objective of the present disclosure includes providing a mold design that provides streamlined fabrication process(es) thereby maximizing profits by minimizing labour hours and/or material expenses.

Another objective of the present disclosure includes providing a mold design that is sufficiently versatile at least to the extent that the mold may be interchangeably used as a stand alone unit and/or as a removable reusable liner within a pre-existing mold.

In order to accomplish the foregoing objectives, inter alia, it is preferred that the mold device include a mold device comprising a body having a hollow, three-dimensional shape with at least one opening therein; said body being made from a material having a malleable characteristic, and having an axis extending vertically there through.

Other objectives, advantages, and novel features of the present invention will become more apparent from the following detailed description when taken in conjunction with the accompanying drawings.

BRIEF DESCRIPTION OF THE DRAWINGS

The following drawings, in which like reference characters indicate like parts, are provided for illustration of the invention and are not intended to limit the invention in any manner whatsoever.

DETAILED DESCRIPTION OF THE INVENTION

Figure 1:
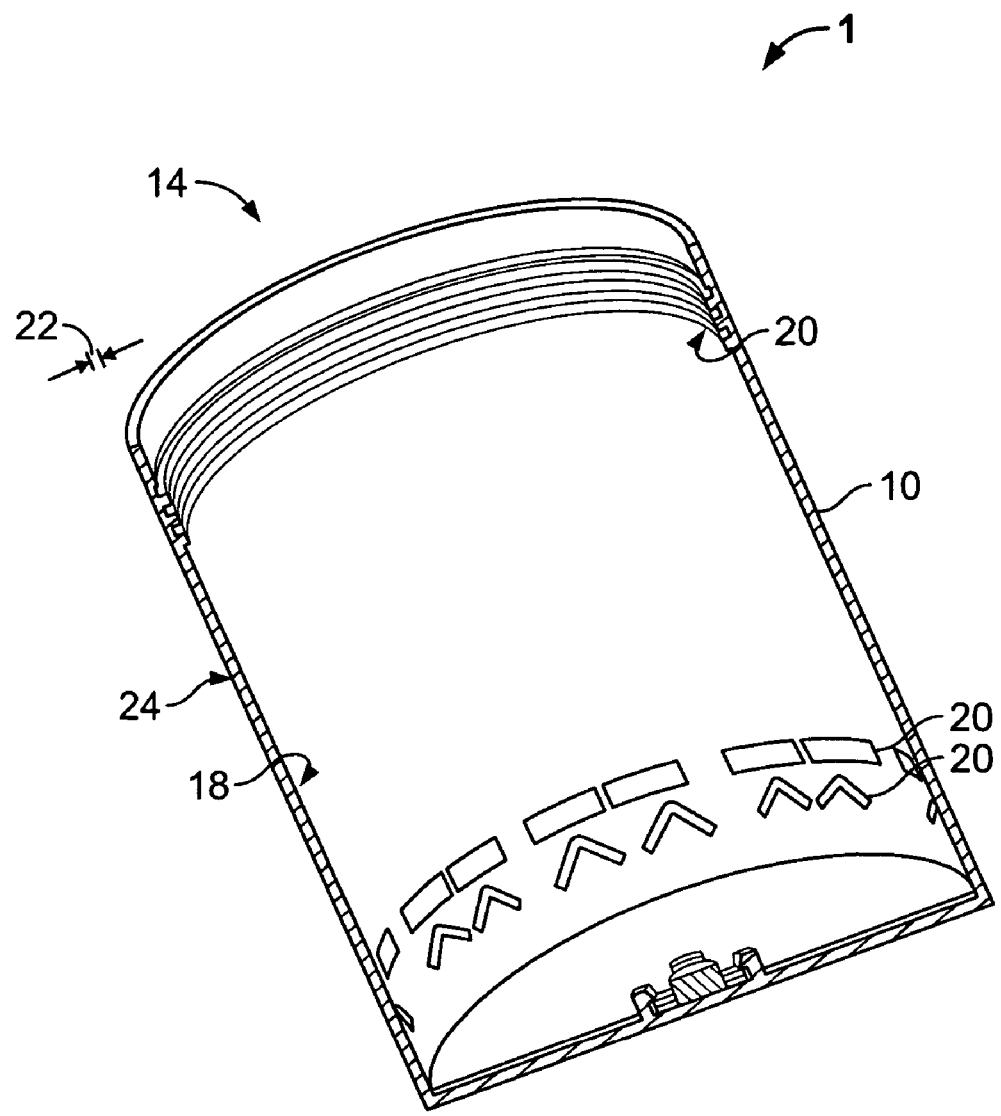
FIG. 1 depicts an isometric cross-sectional view of the preferred embodiment.
Figure 2A:
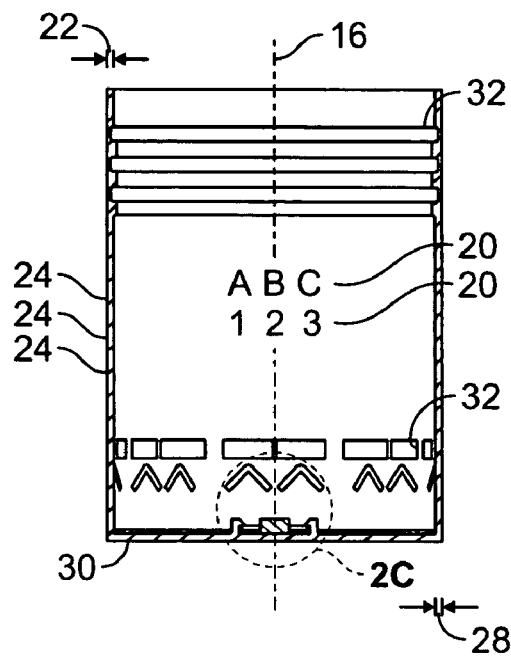
FIG. 2A depicts a front cross-sectional view (2A-2A) of the preferred embodiment.
Figure 2B:
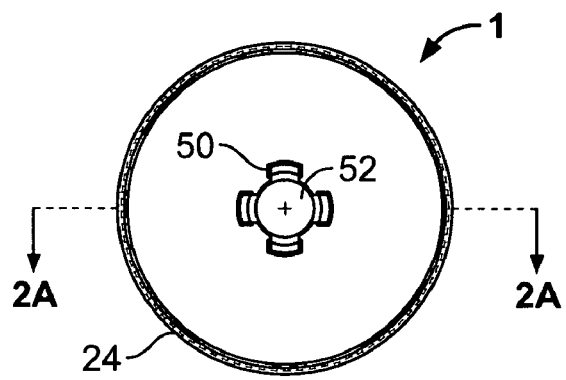
FIG. 2B depicts top view of the preferred embodiment.
Figure 2C:
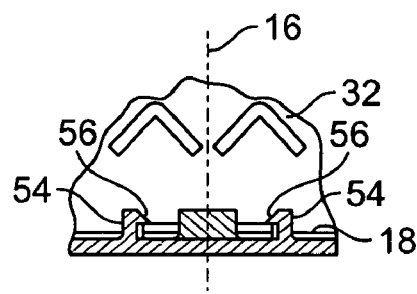
FIG. 2C depicts an enlarged partial cross-sectional view of FIG. 2A of the preferred embodiment.

The following descriptions of the preferred embodiments are presented to illustrate the present invention and are not to be construed to limit the claims in any manner whatsoever. In reference to the drawings, namely FIGS. 1 to 2C, a preferred embodiment of the present invention is disclosed, which is directed to a mold device 1 comprising a body 10 having a hollow, three-dimensional shape 12 with at least one opening 14 therein. The body 10 being made from a material having a malleable characteristic, and having an axis 16 extending vertically therethrough. The size of said opening 14 is dependent on at least two factors and the relationship therebetween, first, the malleability of the material, e.g., how far the material can stretch to permit removal of a candle from the mold 1 and thereafter return to its 1 original shape 12 for reuse (i.e., durometer rating), and the second factor, namely, the widest diameter of the body of the candle to pass through the opening 14 of the mold 1. For example, the greater the elasticity/malleability of the material, the smaller the opening 14 can be in relation to the widest diameter of the candle that needs to pass through the opening.

The shape 12 of the body 10 can be, inter alia, any of the following, taken either alone or in combination, namely conical, cylindrical, pyramidal, spherical, rectangular, pentagonal, hexagonal, heptagonal, and octagonal in design, although any shape may be incorporated herein. The inner surface 18 of said body 10 is, optionally, topographically contoured 20; for example, the inner surface 18 can be embossed, engraved, and/or etched, either alone or in combination. Moreover, it is envisioned that such topography 20 may include alpha and/or numeric characters, furthermore, it is additionally envisioned that any type of characters and/or design may be incorporated either alone or in combination therewith. The inner surface 18 of said body 10 is, optionally, topographically contoured 20 having a tolerance 22 with an upper limit of about five hundred (500) thousands of an inch; the inner surface 18 of said body 10 is, optionally, topographically contoured 20 having a tolerance 22 range of about thirty (30) to three hundred seventy five (375) thousands of an inch; the inner surface 16 of said body 10 is, optionally, topographically contoured 20 having a tolerance 22 range of about thirty (30) to two hundred fifty (250) thousands of an inch.

The body 10 is unitary and has an outer surface 24 that is substantially smooth 26. The mold 1 device is versatile at least to the extent that it may be deployed either alone as a stand alone unit (as shown), or it may be deployed in conjunction with a preexisting metal candle mold (not shown). For example, the mold 1 is designed to retro fit and be inserted into a metal candle mold, hence the outer surface 24 permits the mold 1 to reuseably and removably slide into the metal mold as a liner therein; hence the significance of a substantially smooth 26 outer surface 24 in the later deployment. Furthermore, the material is selected from the group consisting of: nitrile, flouroelastomer, natural, and neoprene rubber, although it is envisioned that other materials may be utilized providing these other materials exhibit the necessary characteristics set forth herein; additionally, the material has a high sheer tolerance and is chemically inert. The unitary mold device 1 includes a hollow elongated malleable body 10 having a thickness 28 and wherein said body 10 includes an axis 14 extending therethrough. The body 10 further being enclosed on a first end 30, wherein at least a portion 32 of the inner surface 18 of said body 10 is topographically contoured 20 and/or is partially non-smooth. The depth and height of said portion 32 has an upper limit of about five hundred (500) thousands of an inch; as does the thickness 28 has an upper limit of about five hundred (500) thousands of an inch.

The inner surface 18 includes reusable means 50 for releaseably receiving and positioning a wick stand (not shown), wherein said means 50 has a center 52; wherein said means 50 includes a protrusion 54, having a proximal and distal end, wherein the proximal end is cooperatively connected to said inner surface 18, said distal end extending substantially parallel to the axis 14; wherein said center 52 is substantially located on said axis 14. The protrusion 54 includes a lip 56 extending substantially radially inward from the distal end of said protrusion 54 towards the axis 16. Alternatively, the reusable means 50 may be a recess (not shown) depending on the desired model specification, in either case, the means 50 functions to, inter alia, position and releaseably hold the wick clip assembly in position.

In order to assist one in the understanding of the operation of the present invention 1, it would be advantageous to consider a method of use in practice. In the preferred embodiment, once the mold 1 has been fabricated having the desired specifications, for example, height, width, depth, shape 12, volume, and topography 20, the mold 1 is positioned with the opening 14 oriented upward. Thereafter, a wick clip assembly having preferably a zinc core cotton wick extending upwardly from a base can be inserted into the reusable means 50 for releasably receiving and positioning the wick stand/base. More particularly, the reusable means 50 is either a protrusion 54 as set forth and described above or a recess (not shown), depending on the desired model specification, in either case, the means 50 functions to, inter alia, position and releasably hold the wick clip assembly in position during the pouring and curing of the candle. Once inserted, the candle material is poured into the mold 1 to the desired volume/level, and the distal end of the wick may optionally be repositioned, during and/or after the pouring, to the desired position (i.e., centered vs. non-centered), whereafter the candle is set aside to cure. Once cured, the mold 1 is removed from about the candle wherein the reusable means 50 releases the base of the wick clip assembly with minimal pressure so as not to (i) separate the wick from the base (ii) damage the candle nor (iii) compromise the integrity between the wick clip assembly and the candle itself. Moreover, concurrently, the mold 1 is quasi-delicately removed from any topographical contours 20 so as not to damage the cured contours of the candle (finished product).

Furthermore, should the deployment encompass the use of mold device 1 as a liner, then there would be an additional step of inserting the mold device 1 into the metal candle mold (not shown); as well as the additional step of removing the mold device 1 as a liner from the metal candle mold prior to removing the mold 1 from the cured candle. In this embodiment, the mold device 1 because it is malleable, the shape of the metal candle mold, for example, a concave base portion or meniscus shape of the metal candle mold will be substantially transferred to the candle, as the mold device 1 substantially conforms to the shape of the metal mold.

Figure 3A:
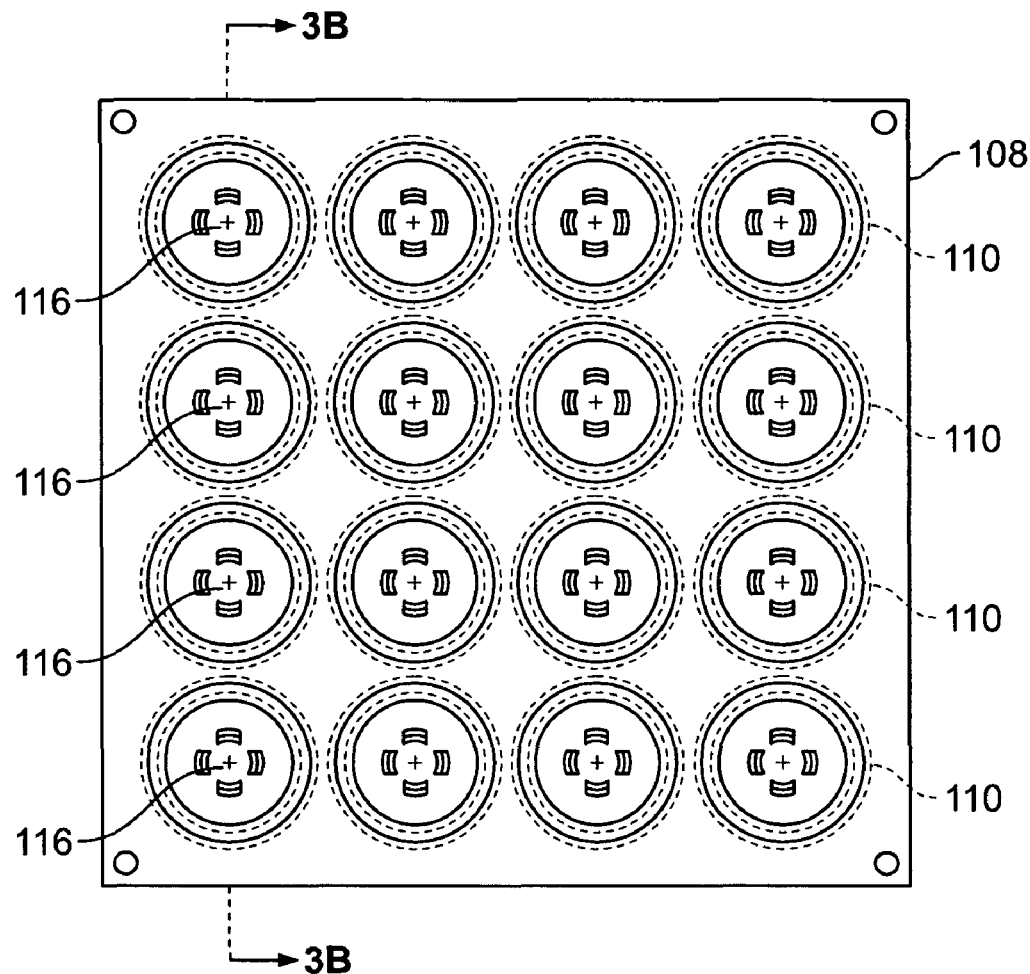
FIG. 3A depicts a top view of an alternative embodiment.
Figure 3B:
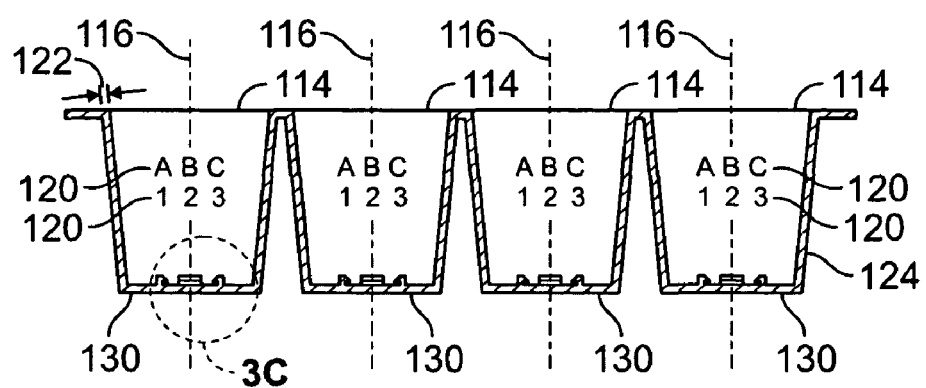
FIG. 3B depicts a front cross-sectional view (3B-3B) of an alternative embodiment.
Figure 3C:
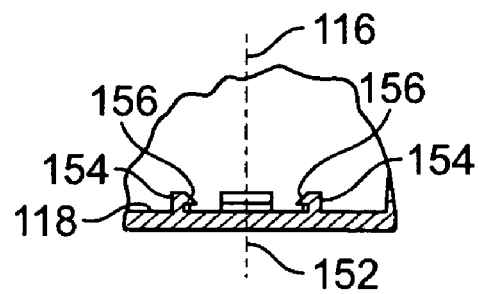
FIG. 3C depicts an enlarged partial cross-sectional view of FIG. 3A of the preferred embodiment.
Figure 3D:
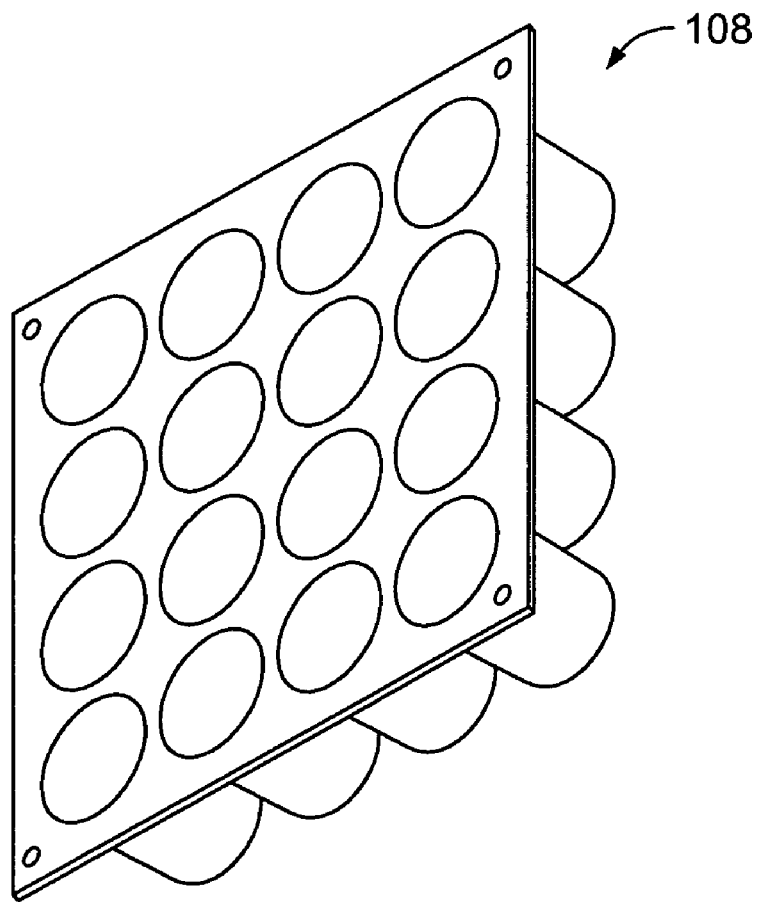
FIG. 3D depicts isometric view of an alternative embodiment.

An alternative embodiment is disclosed in FIGS. 3A to 3C, wherein a plurality of bodies 108 are cooperatively interconnected together so as to form a tray, wherein said bodies 110 are substantially in the same plane, wherein each body 110 having a hollow, three-dimensional shape 112 with at least one opening 114 therein; said body 110 being made from a material having a malleable characteristic, and having an axis 116 extending vertically there through, wherein each axis 116 is substantially parallel. The inner surface 118 of said body 110 is, optionally, topographically contoured 120, having a tolerance 122 with an upper limit of about five hundred (500) thousands of an inch, and wherein the overall thickness of each body 110 has an upper limit of about five-hundred (500) thousands of an inch; although it is envisioned that the overall thickness may be approach one inch, depending, inter alia, on the desired depth of the impression on the candle.

The shape 112 of the body 110 can be, inter alia, any of the following, taken either alone or in combination, namely conical, cylindrical, pyramidal, spherical, rectangular, pentagonal, hexagonal, heptagonal, and octagonal in design, although any shape may be incorporated herein. The inner surface 118 of said body 110 is, optionally, topographically contoured 120; for example, the inner surface 118 can be embossed, engraved, and/or etched, either alone or in combination. Moreover, it is envisioned that such topography 120 may include alpha and/or numeric characters, furthermore, it is additionally envisioned that any type of characters and/or design may be incorporated either alone or in combination therewith. The inner surface 118 of said body 110 is, optionally, topographically contoured 120 having a tolerance 122 with an upper limit of about five hundred (500) thousands of an inch; the inner surface 118 of said body 110 is, optionally, topographically contoured 120 having a tolerance 122 range of about thirty (30) to three hundred seventy five (375) thousands of an inch; the inner surface 116 of said body 110 is, optionally, topographically contoured 120 having a tolerance 122 range of about thirty (30) to two hundred fifty (250) thousands of an inch.

The body 110 is unitary and has an outer surface 124 that is substantially smooth 126. The mold 1 device is versatile at least to the extent that it may be deployed either alone as a stand alone unit (as shown), or it may be deployed in conjunction with a preexisting metal candle mold (not shown). For example, the mold 1 is designed to retro fit and be inserted into a metal candle mold, hence the outer surface 124 permits the mold 1 to reuseably and removably slide into the metal mold as a liner therein; hence the significance of a substantially smooth 126 outer surface 124 in the later deployment. Furthermore, the material is selected from the group consisting of: nitrile, flouroelastomer, natural, and neoprene rubber, although it is envisioned that other materials may be utilized providing these other materials exhibit the necessary characteristics set forth herein; additionally, the material has a high sheer tolerance and is chemically inert. The unitary mold device 1 includes a hollow elongated malleable body 110 having a thickness 128 and wherein said body 110 includes an axis 114 extending therethrough. The body 110 further being enclosed on a first end 130, wherein at least a portion 132 of the inner surface 118 of said body 110 is topographically contoured 120 and/or is partially non-smooth. The depth and height of said portion 132 has an upper limit of about five hundred (500) thousands of an inch; as does the thickness 128 has an upper limit of about five hundred (500) thousands of an inch.

The inner surface 118 includes a reusable means 150 for releasably positioning a wick stand (not shown), wherein said means 150 has a center 152; wherein said means 150 includes a protrusion 154, having a proximal and distal end, the proximal end is cooperatively connected to said inner surface 118, said distal end extending substantially parallel to the axis 116; said center 152 is substantially located on said axis 116; and said protrusion 154 includes a lip 156 extending substantially radially inward from the distal end of said protrusion 154 for grasping a base of a wick clip assembly (not shown). Alternatively, the reusable means 150 may be a recess (not shown) depending on the desired model specification, in either case, the means 150 functions to, inter alia, position and releaseably hold the wick clip assembly in position.

All of the above referenced patents; patent applications and publications are hereby incorporated by reference. Many variations of the present invention will suggest themselves to those of ordinary skill in the art in light of the above detailed description. All such obvious modifications are within the full-intended spirit and scope of the claims of the present application both literally and in equivalents recognized at law.

What is claimed is:

1. A candle mold device comprising:
a unitary, stand alone, one piece, seamless body having a hollow, three-dimensional shape with at least one opening therein; said body having a substantially uniform thickness with an inner and outer surface, and being made from a uniform material which is malleably reusable and capable of flexation during demolding, and which returns to its original shape after each demolding, and having an axis extending vertically there through, wherein said body yields a seamless product,
wherein the inner surface includes reuseable means having a center for releasably positioning a wick stand, wherein said means has a center;
wherein said means includes a protrusion, having a proximal and distal end, wherein the proximal end is cooperatively connected to said inner surface, said distal end extending substantially parallel to the axis;
wherein said center is substantially located on said axis; and
wherein said means includes a lip extending substantially radially inward from the distal end of said protrusion.

2. A device as in claim 1, wherein said shape is substantially selected from the group consisting of: conical, cylindrical, pyramidal, spherical, rectangular, pentagonal, hexagonal, heptagonal, and octagonal.

3. A device as in claim 1, wherein the inner surface of said body is topographically contoured.

4. A device as in claim 1, wherein the inner surface of said body is topographically contoured having a tolerance with an upper limit of about five hundred (500) thousands of an inch.

5. A device as in claim 1, wherein the inner surface of said body is topographically contoured having a tolerance range of about thirty (30) to three-hundred- seventy-five (375) thousands of an inch.

6. A device as in claim 1, wherein the inner surface of said body is topographically contoured having a tolerance range of about thirty (30) to two-hundred-fifty (250) thousands of an inch.

7. A device as in claim 1, wherein the outer surface is substantially smooth.

8. A device as in claim 1, wherein said material is selected from the group consisting of: nitrile, flouroelastomer, natural, neoprene, and silicone rubber.

9. A device as in claim 1, wherein said material has a high shear tolerance.

10. A device as in claim 1, wherein said material is chemically inert.

11. A unitary, stand alone, one piece candle mold device comprising:
a hollow elongated seamless body which is malleably reusable and capable of flexation during demolding and returns to its original shape after each demolding, wherein said body has a substantially uniform thickness with an inner and outer surface, and an axis extending there through, said body further being enclosed on a first end, and made from a uniform chemically inert material, wherein said body yields a seamless products;
wherein the inner surface includes reuseable means having a center for releasably positioning a wick stand, wherein said means has a center;
wherein said means includes a protrusion, having a proximal and distal end, wherein the proximal end is cooperatively connected to said inner surface, said distal end extending substantially parallel to the axis;
wherein said center is substantially located on said axis; and
wherein said means includes a lip extending substantially radially inward from the distal end of said protrusion.

12. A device as in claim 11, wherein at least a portion of the inner surface of said body is topographically contoured.

13. A device as in claim 11, wherein at least a portion of said inner surface is partially non-smooth.

14. A device as in claim 12, wherein at least a portion of said inner surface is selected from the group consisting of engraved, and embossed.

15. A device as in claim 11, wherein said thickness has an upper limit of about five hundred (500) thousands of an inch.

16. A device as in claim 11, wherein said thickness has an upper limit of about one-inch.

17. A candle mold device comprising:
a plurality of unitary, one-piece, seamless bodies cooperatively interconnected together substantially in the same plane, wherein each body having a hollow, three-dimensional shape with at least one opening therein; said body having a substantially uniform thickness with an inner and outer surface, and being made from a uniform material which is malleably reusable and capable of flexation during demolding, and which returns to its original shape after each demolding, and having an axis extending vertically there through, wherein each axis is substantially parallel, wherein each body yields a seamless product;
wherein the inner surface includes reuseable means having a center for releasably positioning a wick stand, wherein said means has a center;
wherein said means includes a protrusion, having a proximal and distal end, wherein the proximal end is cooperatively connected to said inner surface, said distal end extending substantially parallel to the axis;
wherein said center is substantially located on said axis; and
wherein said means includes a lip extending substantially radially inward from the distal end of said protrusion.

18. A device as in claim 17, wherein the inner surface of said body is topographically contoured.

19. A device as in claim 17, wherein the inner surface of said body is topographically contoured having a tolerance with an upper limit of about five hundred (500) thousands of an inch.

20. A device as in claim 17, wherein the overall thickness of each body has an upper limit of about one-inch.

21. A device as in claim 11, wherein said material is selected from the group consisting of: nitrile, flouroelastomer, natural, neoprene, and silicone rubber.

22. A device as in claim 17, wherein said material is selected from the group consisting of: nitrile, flouroelastomer, natural, neoprene, and silicone rubber.

* * * * *